March 21, 1961 S. S. WULC 2,976,001

MOUNTING RACK AND DETACHABLE FRAME

Filed Feb. 6, 1958

INVENTOR.
STANLEY S. WULC.
BY Harry Langsam
Stanley Bilker
attorneys

United States Patent Office 2,976,001

Patented Mar. 21, 1961

2,976,001

MOUNTING RACK AND DETACHABLE FRAME

Stanley S. Wulc, Lafayette Hills, Pa., assignor to Vector Manufacturing Company, Inc., Southampton, Pa., a corporation of Pennsylvania Filed Feb. 6, 1958, Ser. No. 713,755

5 Claims. (Cl. 248—224)

My invention relates to a supporting rack for a removable frame within which frame electronic or other types of electrical equipment may be mounted.

It is an object of my invention to provide one or more removable frames with a complementary supporting rack which may be detachably held together; and wherein the equipment mounted within the frame may be examined, calibrated, tested or repaired after removal from the rack.

Another object of my invention is to provide one or more frames for retaining electrical equipment which will be definitely and accurately aligned in its mounting rack.

Other objects of my invention are to provide an improved device of the character described, that is easily and economically produced, which is sturdy in construction, and which is highly efficient in operation.

With the above and related objects in view, my invention consists in the deails of construction and combination of parts, as will be more fully understood from the following description, when read in conjunction with the accompanying drawing, in which.

Figures 1, 2, 3, 4:
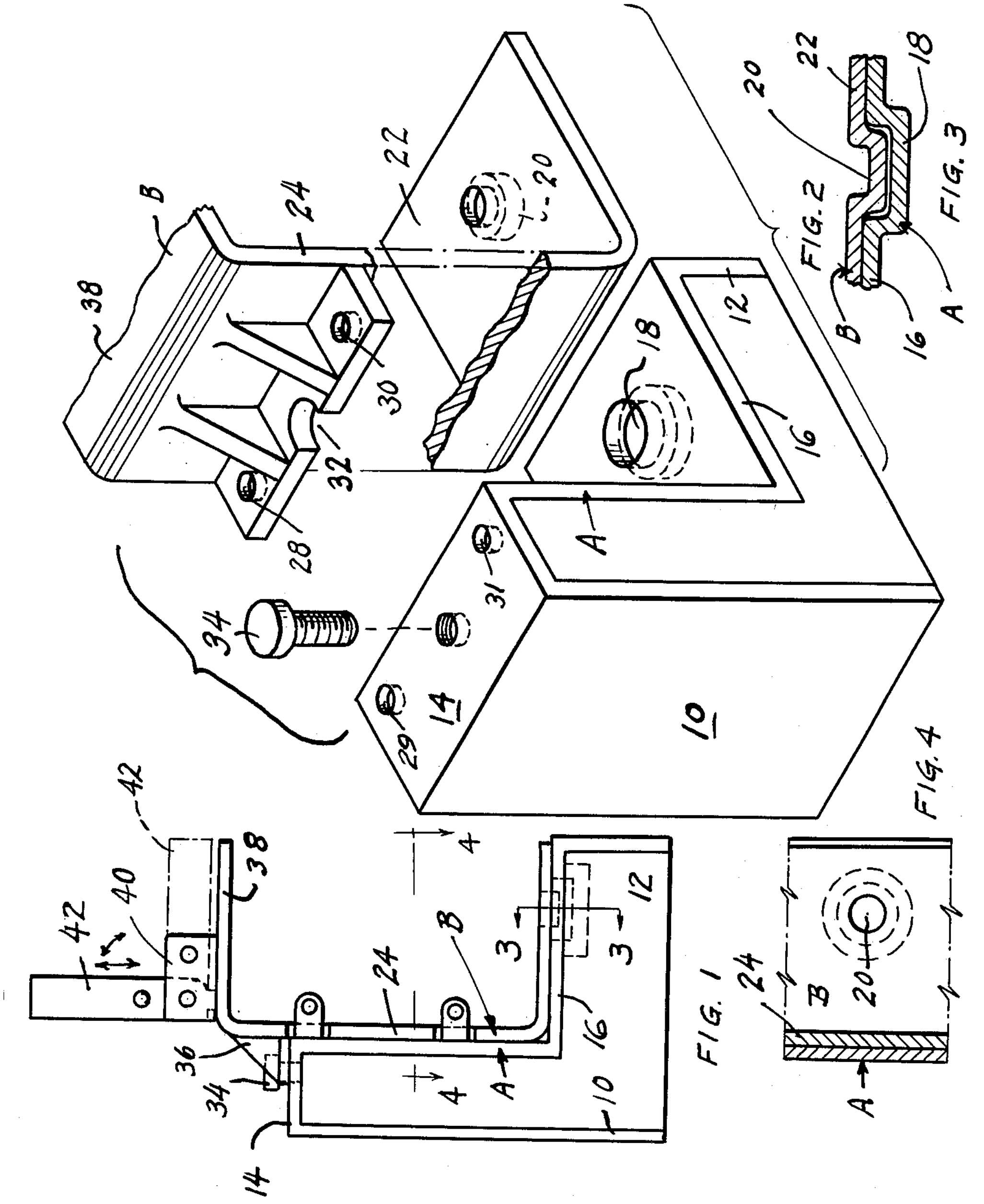
Fig. 1 is a side elevational view of a retaining frame, without the electrical equipment mounted therein and a mounting rack.
Fig. 2 is an enlarged fragmentary view of a portion of a mounting rack, the holding screw, and the removable frame.
Fig. 3 is an enlarged sectional view taken along the line 3—3 of Fig. 1.
Fig. 4 is a fragmentary view showing the aligning projection on the removable frame.

Referring now in greater detail to the drawing, I show a mounting rack, generally designated as A, which may be made of metal or plastic or a synthetic resin and which may be held within a casing (not shown) for supporting electrical equipment such as an oscillator or electrical meters of various types. The mounting rack A may retain one or more U-shaped frames, generally designated as B. The rack may be of a length to hold a row of frames and it may be of an L-shape to hold the frames in alignment.

The integrally formed mounting rack A of ferrous or non-ferrous metal, plastic, or synthetic resin, may have a series of vertically arranged legs or arms 10 and 12 which support horizontal levels or platforms 14 and 16. The lower level supporting portion 16 has a recess 18 therein to receive an interfitting projection 20 that is a part of the frame B. The supporting portion 16 has the extension 22 resting thereon with the projection 20 resting in the recess 18.

The vertical portion 24 of the removable frame B carries a bracket 36 which bracket may have mounting holes 28 and 30 therein and a notched out edge recess 32 through which a removable locking screw 34 projects. The vertical side portion of the removable frame 24 abuts a vertical wall of the mounting rack A.

The leg 22 of the oscillator frame rests upon the horizontal projecting level 16 of the mounting rack A and the downwardly projecting extension 20 interfits within a complementary recess 18 in the mounting rack A. The head of the locking bolt 34 abuts upon the upper surface of the bracket 36 while the stem of the bolt nestles in the recess 32 whereby the mounting rack and the bracket are detachably and securely held together.

If necessary, holding screws may pierce the bracket 36 by way of the holes 28 and 30 and be held within the threaded holes 29, 31 so that the head of the screw or bolt holds the bracket 36 tightly to the top mounting rack A.

From the aforementioned description it should be apparent that the holding bolt 34 forces the bracket 36 and the mounting rack A tightly together to hold the frame and its instruments rigidly together to the rack; but for repairs, the oscillator frame B may be removed from the mounting rack by loosening the retaining bolts and pulling upon a handle 42.

An upper leg 38 of the oscillator frame carries a pair of handle supporting brackets 40 to which is pivotally attached a handle 42. The brackets 40 carry the pivotally mounted handle 42 so that the handle 42 may be pulled away from the mounting rack. To reinsert the removable frame B into the rack, the handle may be locked in a vertical position whereby the pressure imposed directly upon the handle can force the oscillator frame to the mounting rack. The handle and bracket construction is described in detail in my co-pending application, Serial No. 708,305, filed January 10, 1958, now Patent No. 2,940,114, issued on June 14, 1960.

Due to the fact that the electrical instruments carried within the detachable frame B are extremely sensitive, they must be firmly anchored to the mounting rack and they must be easily removed and must be easily replaced when necessary, and accurately aligned to interfit with the other electrical equipment carried by the mounting rack.

The number of removable frames may be varied just as the length and width of the rack may be varied.

In Fig. 3 the interfitting and aligning parts may be pressed out or they may be made of individual aligning elements.

Although my invention has been described in considerable detail, such description is intended as being illustrative rather than limiting, since the invention may be variously embodied, and the scope of the invention is to be determined as claimed.

I claim:

1. In combination, a mounting rack and a complementary frame for carrying electrical equipment and being detachably supportable by the rack in only one given alignment, said frame being of substantially U-shaped configuration and having a base, an upright side wall, and a top member, and said rack having a base and upright side wall for snugly accommodating said frame, an interfitting complementary projection and recess located on the bases of said rack and frame to provide a given aligned position of the rack and frame, a bracket projecting from the side of the frame to rest against the rack, connector means for detachably locking the bracket to the rack, a pivotally mounted handle on the top member of the frame and being positionable in an upright position whereby the frame may be accurately guided into its aligned position on the rack.

2. An electrical chassis and support assembly comprising a mounting rack member for receiving and detachably retaining a frame member carrying electrical components, said rack having a base and upright wall and said frame having a base and upright side wall to nest in said frame, an extension on the base of one of said members and a recess in the base of the other for receiving the extension and providing with said nesting bases and walls only one given alignment of the frame and rack, handle means on the frame whereby the frame may be accurately guided into its aligned position on said rack and removed therefrom, a support means on said frame side wall for resting against the rack when the members are aligned, and connector means for detachably locking said support to said rack.

3. In the assembly of claim 2, said rack being formed to provide a platform thereon to receive the support means from the frame, said frame support means comprising a bracket outstanding from the side wall of the frame to rest on said platform, and said connector means comprising a member engageable with the rack and detachably locking said bracket to the rack.

4. In combination, a plug-in electrical chassis and supporting structure comprising a substantially U-shaped frame member for accommodating electrical components and wiring within the U frame, a rack member for receiving the frame in a given aligned position, said rack having a base, an upright side wal land being provided with a platform above the base, a bracket outstanding from the frame for resting on the platform of the rack whereby when the U-shaped frame is aligned on the rack its side engages the side of the rack and its bracket rests on the platform of the rack, means for detachably locking the bracket to the platform, a projection on one of said members and a recess in the other member adapted to interfit when the frame is aligned in the rack, and a handle on the frame whereby the frame may be accurately guided into aligned position on the rack.

5. A miniature electronic plug-in chassis and rack assembly comprising a chassis frame of substantially U-shaped construction having a base portion, an upright side wall and a top portion, said frame being adapted to accommodate a plurality of electronic components and electrical wiring within the U-shaped enclosure, a handle means pivotally supported from the top portion of the frame, a flange outstanding rearwardly from the side wall in a direction opposite from the top member and at a position along the side wall below the top portion, a rack for receiving the frame in a given aligned position, said rack having a base portion and an upright side wall, said wall of the rack extending upwardly from the base at a distance substantially the same as the distance of the flange above the base of the frame, said rack wall being provided with a platform whereby when the frame is inserted on the rack the base of the frame engages the base of the rack, the wall of the frame engages the wall of the rack, and the flange of the frame rests on the platform of the rack, means for detachably connecting the flange on the frame to the platform of the rack, and a projection on one of the members and a recess on the other being located on the base portions thereof and adapted to interfit when the frame is properly aligned on the rack.

References Cited in the file of this patent

UNITED STATES PATENTS

| | | |
|---|---|---|
| 1,276,463 | Wells | Aug. 20, 1918 |
| 1,320,009 | Jacobs | Oct. 28, 1919 |
| 1,437,621 | Theberath | Dec. 5, 1922 |
| 2,610,998 | Lockhart | Sept. 16, 1952 |
| 2,687,860 | McNitt | Aug. 31, 1954 |
| 2,897,033 | Ford | July 28, 1959 |
| 2,940,114 | Wule | June 14, 1960 |